United States Patent
Agrawal

(10) Patent No.: US 9,146,935 B1
(45) Date of Patent: *Sep. 29, 2015

(54) SYSTEMS AND METHODS FOR CLASSIFYING FILES AS CANDIDATES FOR DEDUPLICATION

(71) Applicant: Symantec Corporation, Mountain View, CA (US)

(72) Inventor: Namita Agrawal, Baner (IN)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,078

(22) Filed: Aug. 14, 2014

Related U.S. Application Data

(63) Continuation of application No. 13/043,441, filed on Mar. 8, 2011, now Pat. No. 8,849,768.

(51) Int. Cl.
 *G06F 17/30* (2006.01)
 *G06F 11/14* (2006.01)

(52) U.S. Cl.
 CPC ...... *G06F 17/30156* (2013.01); *G06F 11/1453* (2013.01); *G06F 2201/80* (2013.01); *G06F 2201/84* (2013.01)

(58) Field of Classification Search
 CPC ............ G06F 17/30147; G06F 17/30156; G06F 17/30489; G06F 3/0641; G06F 11/1453; G06F 17/30138; G06F 17/30067; G06F 11/1464; G06F 11/1471; G06F 17/39156; G06F 2011/80; G06F 2201/84; H04L 63/145; H04L 63/1433; H04L 63/102
 USPC ......... 707/769, 796, 723, 705, 692, 664, 687, 707/650, 648, 640, 699, 690, 803, E17.007, 707/674, E17.002, E17.005, E17.044, 707/E17.046, E17.014, E17.089; 709/203, 709/206, 217, 224, 225, 226; 711/111, 118, 711/133, 136, 154, 150, 162, 165, 168, 711/E12.001, E12.002, E12.103; 715/777; 726/22, 24, 25, 26, 23

See application file for complete search history.

(56) References Cited

U.S. PATENT DOCUMENTS

| | | | |
|---|---|---|---|
| 8,539,359 B2 * | 9/2013 | Rapaport et al. | 715/751 |
| 2003/0182310 A1 * | 9/2003 | Charnock et al. | 707/104.1 |
| 2005/0066225 A1 * | 3/2005 | Rowan et al. | 714/5 |
| 2006/0123414 A1 | 6/2006 | Fors et al. | |

(Continued)

OTHER PUBLICATIONS

Enrico Minack et al.—"Leveraging personal metadata for Desktop search: The Beagle++ system"—Web Semantics: Science, Services and Agents on the World Wide Web—vol. 8, Issue 1, Mar. 2010, pp. 37-54.*

(Continued)

*Primary Examiner* — Anh Ly
(74) *Attorney, Agent, or Firm* — ALG Intellectual Property, LLC

(57) ABSTRACT

A computer-implemented method may include identifying at least one file and detecting an event that is suggestive of at least a portion of the file being duplicated in at least one additional file. The computer-implemented method may also include classifying the file as a candidate for deduplication in response to detecting the event. The computer-implemented method may further include maintaining the file's candidate-for-deduplication classification for use in prompting a determination on whether the portion of the file is already stored within a storage device.

20 Claims, 6 Drawing Sheets

(56) References Cited

U.S. PATENT DOCUMENTS

| | | | |
|---|---|---|---|
| 2006/0136446 A1* | 6/2006 | Hughes et al. | 707/101 |
| 2006/0190493 A1* | 8/2006 | Kawai et al. | 707/104.1 |
| 2007/0198601 A1* | 8/2007 | Prahlad et al. | 707/201 |
| 2007/0198602 A1* | 8/2007 | Ngo et al. | 707/201 |
| 2007/0198608 A1* | 8/2007 | Prahlad et al. | 707/202 |
| 2008/0126704 A1* | 5/2008 | Ulrich et al. | 711/114 |
| 2008/0133561 A1* | 6/2008 | Dubnicki et al. | 707/101 |
| 2008/0243769 A1* | 10/2008 | Arbour et al. | 707/2 |
| 2008/0281908 A1* | 11/2008 | McCanne et al. | 709/203 |
| 2009/0063883 A1* | 3/2009 | Mori | 713/324 |
| 2009/0234892 A1* | 9/2009 | Anglin et al. | 707/201 |
| 2009/0319585 A1* | 12/2009 | Gokhale | 707/205 |
| 2010/0017877 A1* | 1/2010 | Cooley et al. | 726/22 |
| 2010/0106933 A1* | 4/2010 | Kamila et al. | 711/171 |
| 2010/0180075 A1* | 7/2010 | McCloskey et al. | 711/112 |
| 2010/0198797 A1* | 8/2010 | Wideman | 707/692 |
| 2010/0250501 A1* | 9/2010 | Mandagere et al. | 707/692 |
| 2010/0257146 A1* | 10/2010 | Memon et al. | 707/693 |
| 2010/0332401 A1* | 12/2010 | Prahlad et al. | 705/80 |
| 2011/0208933 A1 | 8/2011 | Selfin et al. | |
| 2012/0191671 A1* | 7/2012 | Kitamura et al. | 707/692 |

OTHER PUBLICATIONS

Pham Thi Thu Thuy, Young-Koo Lee and SungYoung Lee—"DTD2OWL: automatic transforming XML documents into OWL ontology"—Published in: Proceeding CIS '09 Proceedings of the 2nd International Conference on Interaction Sciences: Information Technology, Culture and Human—pp. 125-131.*

\* cited by examiner

SYSTEMS AND METHODS FOR CLASSIFYING FILES AS CANDIDATES FOR DEDUPLICATION

CROSS REFERENCE TO RELATED APPLICATION

This application is a continuation of U.S. application Ser. No. 13/043,441 filed 8 Mar. 2011, now U.S. Pat. No. 8,849,768, issued 30 Sep. 2014, the disclosure of which is incorporated, in its entirety, by this reference.

BACKGROUND

Deduplication storage systems are generally used to reduce the amount of storage space needed to store files by identifying redundant data patterns within similar files. For example, a deduplication storage system may divide multiple files into file segments and then identify at least one file segment obtained from one file that is identical to at least one file segment obtained from another file. Rather than storing multiple instances of a particular file segment, the deduplication storage system may store a single instance of the file segment and allow multiple files to simply reference that instance of the file segment to reduce the amount of storage space needed to store the files. As such, deduplication storage systems typically only store file segments that are unique (i.e., non-redundant).

Unfortunately, while deduplication storage systems may reduce the amount of storage space needed to store files, the process of deduplication may demand considerable time and resources. For example, in at least one traditional deduplication technique, a computing device may dedicate considerable time and resources to analyzing various files in an effort to determine whether such files qualify for deduplication (i.e., whether such files include redundant data patterns). As such, even though the computing device may identify some files that qualify for deduplication, the computing device may also be dedicating time and resources to analyzing files that ultimately fail to qualify for deduplication.

What is needed, therefore, is a more efficient and effective mechanism for selecting files for deduplication.

SUMMARY

As will be described in greater detail below, the instant disclosure generally relates to systems and methods for classifying files as candidates for deduplication. In one embodiment, a method for classifying files as candidates for deduplication may include identifying at least one file. For example, an identification module may identify a file as a user of a computing device creates the file.

In one embodiment, a detection module may detect an event that is suggestive of at least a portion of the file being duplicated in at least one additional file. As will be described in greater detail below, any of a variety of events detected by the detection module may suggest that the file includes data that is identical to data included in at least one additional file. In one example, the event may be an attempt by the user to copy a portion of the file into an additional file stored on the computing device. In another example, the event may be an attempt by the user to send the file as an email attachment to one or more additional users whose computing devices are backed up by the same backup system (e.g., a deduplication storage system).

In a further example, the event may be an attempt to download a particular file to the computing device more than once. In an additional example, the event may be an attempt by the user to mark the file to indicate that at least a portion of the file is duplicated in at least one additional file. In some embodiments, the file and the additional file that include duplicate (i.e., redundant) data may be located on the same computing device. In other embodiments, the file and the additional file that include redundant data may be located on different computing devices that are backed up by the same backup system.

In response to detecting the event, a classification module may classify the file as a candidate for deduplication. For example, in response to detecting the user's attempt to copy a portion of the file into the additional file, the classification module may mark both the file and the additional file to indicate that the file and the additional file are candidates for deduplication (i.e., to indicate that the file and the additional file include redundant data). In this example, the classification module may mark each file by storing an attribute associated with the file that indicates that the file includes redundant data.

In some embodiments, the candidate-for-deduplication classification may indicate whether the file is a favorable or unfavorable candidate for deduplication. In such embodiments, the file may qualify for one or more specific types of deduplication based on whether the file is classified as a favorable or unfavorable candidate for deduplication. For example, while a favorable candidate for deduplication may qualify for source-side, in-band, and/or variable-block deduplication, an unfavorable candidate for deduplication may qualify for target-side, out-of-band, and/or fixed-block deduplication.

In some embodiments, the classification module may maintain the file's candidate-for-deduplication classification for use in prompting a determination on whether the portion of the file is already stored within a particular storage device (e.g., a backup storage device that implements data deduplication). The classification module may maintain the attribute associated with the file within a database that stores file attributes. Additionally or alternatively, the classification module may maintain the attribute associated with the file within the file itself.

In one example, the classification module may store the attribute associated with the file by setting at least one binary digit of metadata to indicate that the file is a candidate for deduplication (i.e., to indicate that the file includes redundant data). In addition to identifying whether the file is a candidate for deduplication, the attribute may include metadata that identifies a variety of other characteristics associated with the file. For example, the attribute may include metadata that identifies how frequently the file is modified and/or the number of additional files that are expected to include the redundant data. The attribute may also include metadata that identifies at least one storage location where an instance of the file is stored.

In some embodiments, the classification module may determine whether the file appears to be modified too frequently to be classified as a candidate (e.g., a favorable candidate) for deduplication. For example, after the file has been classified as a candidate for deduplication, the detection module may detect one or more attempts to modify the file. In this example, the classification module may determine that the number of detected attempts to modify the file is above a predetermined threshold. The classification module may then remove the file's candidate-for-deduplication classification in response to determining that the number of detected attempts to modify the file is above a predetermined threshold.

In some embodiments, another method for determining whether files are candidates for deduplication may include identifying a file. For example, the identification module may identify the file that was previously created by the user of the computing device. The identification module may then identify a classification assigned to the file that is suggestive of at least a portion of the file being duplicated in at least one additional file. For example, the identification module may identify at least one binary digit of metadata that represents the classification assigned to the file.

In some embodiments, a deduplication module may determine that the file is a candidate for deduplication based on the classification assigned to the file. For example, the deduplication module may determine that the file is a candidate for deduplication based on the binary digit of metadata being set to indicate that the file includes redundant data. The candidate-for-deduplication classification assigned to the file may prompt the deduplication module to determine whether the portion of the file is already stored within a particular storage device (e.g., a backup storage device that implements data deduplication).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
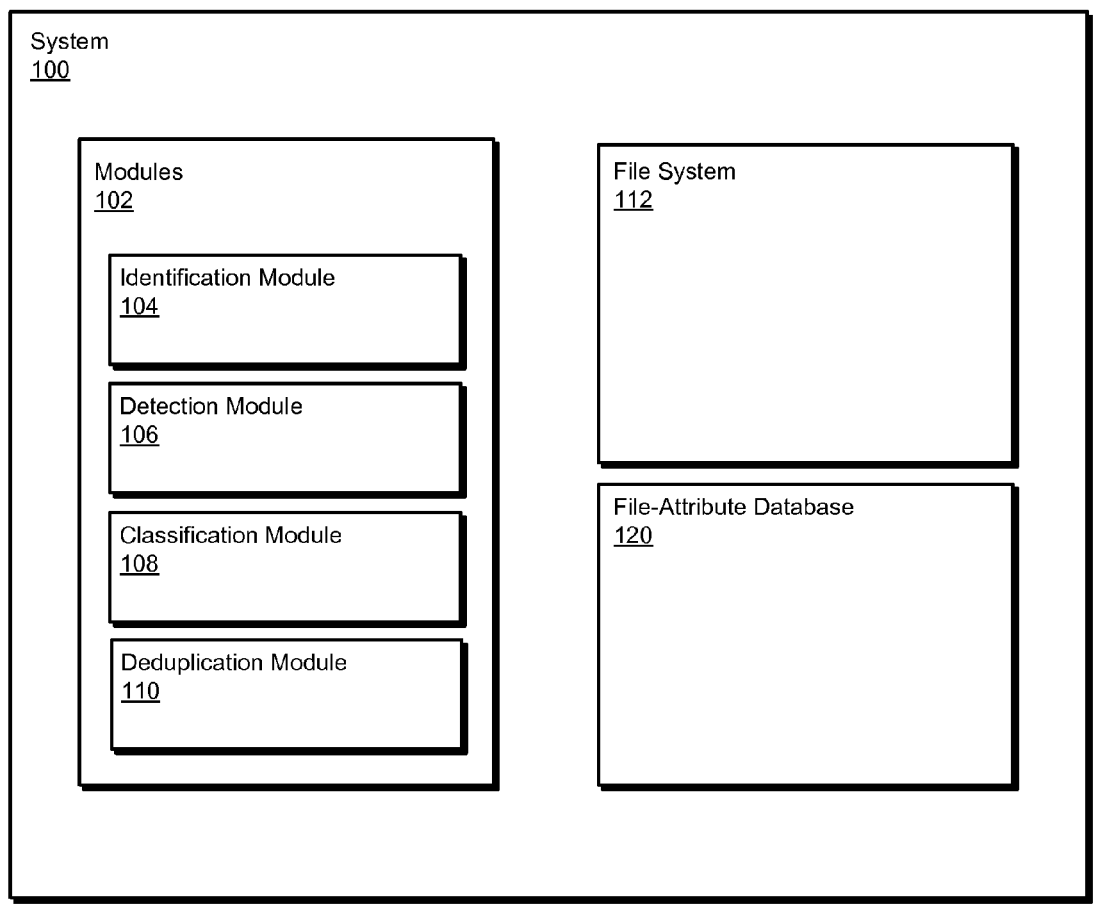
FIG. 1 is a block diagram of an exemplary system for classifying files as candidates for duplication.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for classifying files as candidates for duplication. In one example, a human resources officer may create a document file to be electronically distributed to various employees within an organization. In this example, the organization may rely on a single deduplication storage system to back up several, if not all, of the employees' computing devices.

Since the document file is expected to be downloaded by various computing devices within the organization, the human resources officer may mark the file to indicate that the document file is likely to be duplicated among the employees' computing devices. In other words, this mark (or classification) assigned to the document file may indicate that various computing devices backed up by the deduplication storage system may include an instance of the document file. For example, while performing a backup of the employees' computing devices, the deduplication storage system may encounter a first instance of the document file on one of the employees' computing devices. The deduplication storage system may then determine, based on the mark (or classification) assigned to the document file, that an instance of the document file is likely to be located on various other computing devices operated by employees within the organization.

In addition, the deduplication storage system may determine whether the document file has already been backed up. If the document file has yet to be backed up, the deduplication storage system may back up the document file. However, if the document file has already been backed up, the deduplication storage device may simply proceed to the next file to avoid performing a redundant backup operation on the document file. After the document file has been backed up, the deduplication storage system may skip the document file the next time that the document file is encountered during a backup operation.

Figure 2:
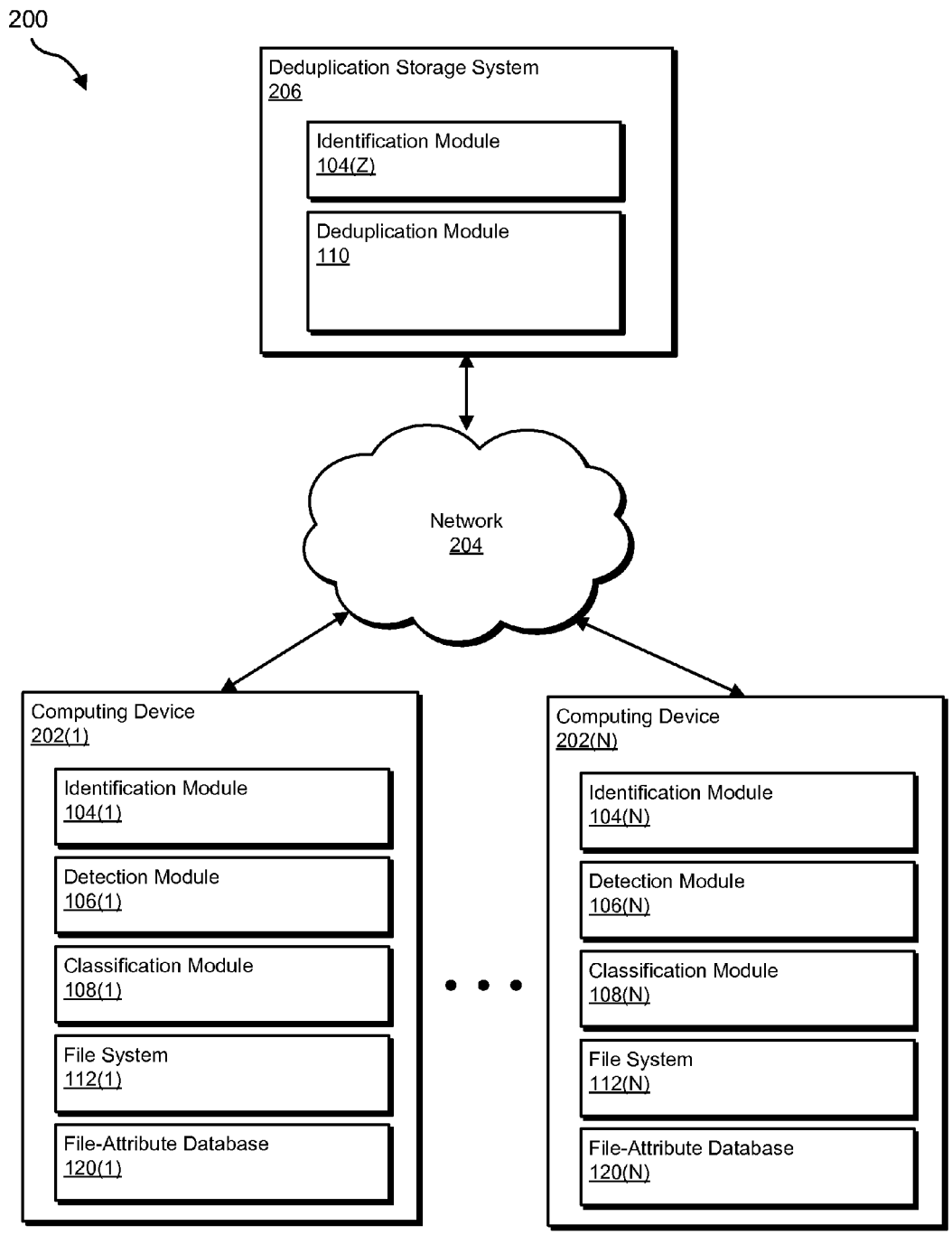
FIG. 2 is a block diagram of another exemplary system for classifying files as candidates for duplication.

The following will provide, with reference to FIGS. 1-2, detailed descriptions of exemplary systems for classifying files as candidates for duplication. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 classifying files as candidates for duplication. As illustrated in this figure, exemplary system 100 may include one or more modules 102 for performing one or more tasks. For example, and as will be explained in greater detail below, exemplary system 100 may include an identification module 104 programmed to identify at least one file. Exemplary system 100 may also include a detection module 106 programmed to detect an event that is suggestive of at least a portion of the file being duplicated in at least one additional file.

In addition, and as will be described in greater detail below, exemplary system 100 may include a classification module 108 programmed to classify the file as a candidate for deduplication in response to detection of the event. Classification module 108 may also be programmed to maintain the file's candidate-for-deduplication classification for use in prompting a determination on whether the portion of the file is already stored within a storage device.

Exemplary system 100 may further include a deduplication module 110 programmed to determine, upon encountering a file, that the file is a candidate for deduplication. Deduplication module 110 may also be programmed to determine, in response to the file being a candidate for deduplication, whether at least a portion of the encountered file has already been stored within a particular storage device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing devices 202(1)-(N) and/or deduplication storage system 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more file systems and/or databases. In one embodiment, exemplary system 100 may include a file system 112 configured to store and organize one or more files and a file-attribute database 120 configured to store one or more attributes associated with the files stored and organized by file system 112. File system 112 may represent portions of a single file system or computing device or a plurality of file systems or computing devices. Similarly, file-attribute database 120 may represent portions of a single database or computing device or a plurality of databases or computing devices.

File-attribute database 120 in FIG. 1 may represent a portion of one or more computing devices. For example, file-attribute database 120 may represent a portion of deduplication storage system 206 in FIG. 2, computing system 510 in FIG. 5, and/or portions of exemplary network architecture 600 in FIG. 6. Alternatively, file-attribute database 120 in FIG. 1 may represent one or more physically separate devices capable of being accessed by a computing device, such as deduplication storage system 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 200 in FIG. 2. As shown in FIG. 2, system 200 may include computing devices 202(1)-(N) in communication with a deduplication storage system 206 via a network 204. In one embodiment, and as will be described in greater detail below, computing device 202(1) may be programmed by identification module 104(1) and/or detection module 106(1) to identify a file and detect an event that is suggestive of at least a portion of the file being duplicated in at least one additional file.

In one embodiment, computing device 202(1) may be programmed by classification module 108(1) to classify the file as a candidate for deduplication in response to detecting the event. Computing device 202(1) may be further programmed by classification module 108(1) to maintain the file's candidate-for-deduplication classification for use in prompting a determination on whether the portion of the file is already stored in deduplication storage system 206. For example, deduplication storage system 206 may be programmed by identification module 104(Z) to identify the file that has been classified as a candidate for deduplication by computing device 202(1). In this example, deduplication storage system 206 may be programmed by deduplication module 110 to determine, in response to the file being classified as a candidate for deduplication, whether the portion of the file is already stored in deduplication storage system 206.

Computing devices 202(1)-(N) generally represent any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Deduplication storage system 206 generally represents any type or form of computing device capable of implementing data deduplication on a storage device. Deduplication storage system 206 may incorporate one or more storage devices that store and/or organize deduplicated data. Deduplication storage system 206 may include deduplication software that directs deduplication storage system 206 to perform data deduplication. Examples of deduplication storage system 206 include, without limitation, primary storage systems or devices that implement data deduplication, backup storage systems or devices that implement data deduplication, data replication solutions that implement data deduplication, and/or any other types of suitable deduplication storage systems.

Network 204 generally represents any medium or architecture capable of facilitating communication or data transfer between computing devices 202(1)-(N) and deduplication storage system 206. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing devices 202(1)-(N) and deduplication storage system 206.

Figure 3:
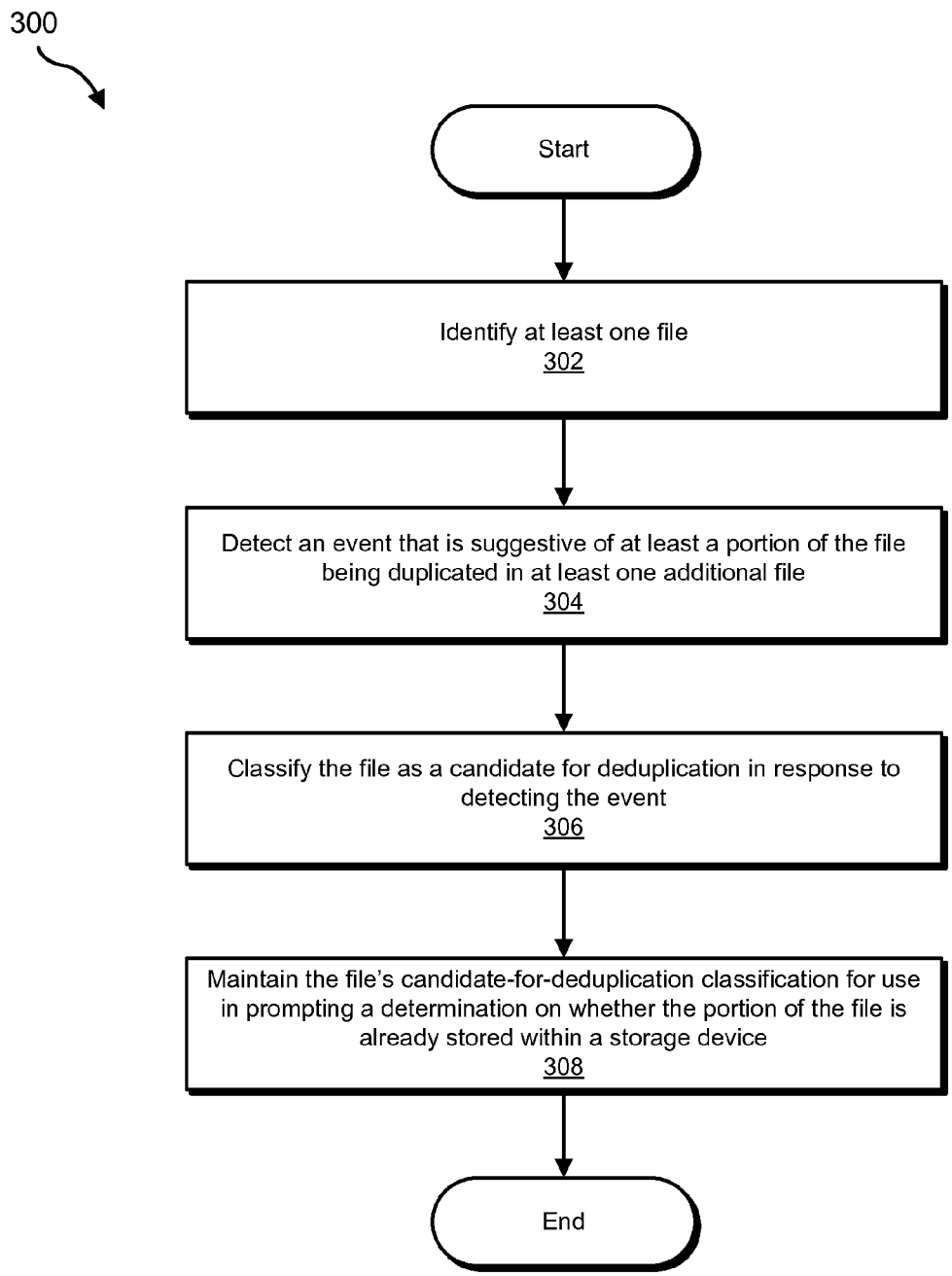
FIG. 3 is a flow diagram of an exemplary method for classifying files as candidates for duplication.

FIG. 3 is a flow diagram of an exemplary computer-implemented method 300 for classifying files as candidates for duplication. The term "deduplication," as used herein, generally refers to any type of process that includes identifying redundant data patterns within one or more files and eliminating and/or avoiding such redundancy by only storing a single instance of the data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated at step 302 in FIG. 3, the various systems described herein may identify at least one file. For example, identification module 104(1) may, as part of computing device 202(1), identify at least one file that is located in file system 112(1). This file identified by identification module 104(1) may represent any type or form of file capable of being stored in file system 112(1) (including, e.g., a document file, a word processing file, a data file, or a program file).

The systems described herein may perform step 302 in a variety of ways. In one example, identification module 104(1) may identify a file as the file is created by a user of computing device 202(1). For example, a user of computing device 202(1) may create or open a new document file. In this example, identification module 104(1) may identify the new document file at the time the user of computing device 202(1) creates or opens the new document file.

In another example, identification module 104(1) may identify a file as the file is first saved by the user of computing device 202(1) under a user-selected file name. For example, after creating a new document file, the user of computing device 202(1) may save the new document file to be stored in file system 112(1) under the user-selected file name "my_doc." In this example, identification module 104(1) may identify the new document file at the time the user of computing device 202(1) first saves the new document under the user-selected file name "my_doc."

As illustrated at step 304 in FIG. 3, the various systems described herein may detect an event that is suggestive of at least a portion of the file being duplicated in at least one additional file. For example, detection module 106(1) may, as part of computing device 202(1), detect an event that is suggestive of at least a portion of the file identified in step 302 being duplicated in at least one additional file. In some embodiments, the file and the additional file that include duplicate (i.e., redundant) data may both be located on computing device 202(1). In other embodiments, the file may be located on computing device 202(1), and the additional file may be located on computing device 202(N).

The systems described herein may perform step 304 in a variety of ways. In one example, detection module 106(1) may detect an attempt by the user of computing device 202(1) to copy at least a portion of the file into at least one additional file. For example, the user of computing device 202(1) may attempt to copy at least a portion of the "my_doc" file into an additional file named "duplicate_doc" that was created by the user on computing device 202(1). In this example, detection module 106(1) may detect the user's attempt to copy at least a portion of the "my_doc" file into the "duplicate_doc" file and then determine that this attempt suggests that these files include at least some redundant data.

In some embodiments, detection module 106(1) may function as a plug-in that directs a file copy program (such as Cp on UNIX-based or UNIX-like systems, Secure Copy (SCP), Rsync, a File Transfer Protocol (FTP) application, or a file or text editor application) to detect the attempt by the user to copy at least a portion of the "my_doc" file into the "duplicate_doc" file. For example, detection module 106(1) may direct a file copy program to detect at least one corresponding command (such as the commands "yy" and/or "p" in the VIM text editor or the commands "Ctrl+c" and/or "Ctrl+v" on Windows-based systems) used to copy at least a portion of the "my_doc" file into the "duplicate_doc" file. Detection module 106(1) may then determine that the detected copy command suggests that the "my_doc" file and the "duplicate_doc" file include at least some redundant data.

In another example, detection module 106(1) may detect an attempt by the user of computing device 202(1) to mark the file to indicate that at least a portion of the file is duplicated in at least one additional file. For example, the user of computing device 202(1) may have created the "my_doc" file to be distributed to one or more additional users (including, e.g., an additional user of computing device 202(N)) within system 200. In this example, the user of computing device 202(1) may attempt to mark the "my_doc" file to indicate that one or more additional instances of the file are likely to be located within system 200 when the user ultimately distributes the file to at least the additional user of computing device 202(N). Detection module 106(1) may detect the user's attempt to mark the "my_doc" file and then determine that this attempt to mark the file is suggestive of one or more duplicate instances of the file being located within system 200.

In a further example, detection module 106(1) may detect an attempt by the user of computing device 202(1) to send the file as an email attachment to one or more additional users whose computing devices are backed up by the same backup system (e.g., deduplication storage system 206). For example, the user of computing device 202(1) may prepare an email that includes the "my_doc" file as an attachment to be sent to various additional users of computing devices (including, e.g., the additional user of computing device 202(N)) within system 200. In this example, detection module 106(1) may function as a plug-in that directs an email client (such as MICROSOFT OUTLOOK, PEGASUS MAIL, MOZILLA'S THUNDERBIRD, or APPLE INC.'S MAIL) or webmail client (such as GMAIL, HOTMAIL, or YAHOO MAIL) to detect an attempt by the user to send the "my_doc" file as an email attachment to various additional users of computing devices within system 200. Detection module 106(1) may then determine that the user's attempt to send the "my_doc" file as an email attachment to various additional users of computing devices within system 200 is suggestive of one or more duplicate instances of the file being located within system 200.

In an additional example, detection module 106(1) may detect an attempt by computing device 202(1) to download the same file more than once. For example, the user of computing device 202(1) may have downloaded a file from a web server (not illustrated in FIG. 2) and stored the file in a particular directory within file system 112(1). In this example, the user of computing device 202(1) may later attempt to download the same file again and store the file in a different directory within file system 112(1). Detection module 106(1) may detect the user's attempt to download the same file for a second time and then determine that this attempt to download the same file for a second time is suggestive of one or more duplicate instances of the file being located on computing device 202(1).

In some embodiments, the web server (not illustrated in FIG. 2) that hosts the file may include a detection module that detects an attempt by computing device 202(N) to download the same file that was previously downloaded by computing device 202(1). For example, the detection module installed on the web server may function as a plug-in that monitors files downloaded by computing devices 202(1)-(N). In this example, the detection module installed on the web server may interface with the server application to detect an attempt by computing device 202(N) to download the same file that was previously downloaded by computing device 202(1). The detection module installed on the web server may detect the attempt by computing device 202(N) to download the same file that was previously downloaded by computing device 202(1) and then determine that this attempt is suggestive of one or more duplicate instances of the file being located within system 200 (e.g., within file systems 112(1) and 112(N)).

In other embodiments, the detection module may be part of a client-server or application-layer network protocol (such as Network File System (NFS) or Common Internet File System (CIFS)) that monitors files downloaded by computing devices 202(1)-(N). For example, the detection module may, while monitoring network traffic between a file server and computing devices 202(1)-(N), detect an attempt by computing device 202(N) to download the same file that was previously downloaded by computing device 202(1). Upon detecting the attempt by computing device 202(N) to download the same file that was previously downloaded by computing device 202(1), the detection module may determine that this attempt is suggestive of one or more duplicate instances of the file being located within system 200 (e.g., within file systems 112(1) and 112(N)).

As illustrated at step 306 in FIG. 3, the various systems described herein may classify the file as a candidate for deduplication in response to detecting the event. For example, classification module 108(1) may, as part of computing device 202(1), classify the file located in file system 112(1) as a candidate for deduplication in response to the event detected in step 304. The phrase "candidate for deduplication," as used herein, generally refers to a file that is likely to include at least one portion that is identical to at least one portion of one or more additional files.

The systems described herein may perform step 306 in a variety of ways. In one example, classification module 108(1) may mark the "my_doc" file to indicate that the file is a candidate for deduplication. For example, classification module 108(1) may store an attribute (e.g., metadata) associated with the "my_doc" file that indicates that at least a portion of the "my_doc" file is duplicated in at least one additional file located within system 200. In this example, the attribute may be represented by at least one binary digit of metadata that has been set to indicate that at least a portion of the "my_doc" file is duplicated in at least one additional file.

In addition to simply indicating that at least a portion of the file is duplicated in at least one additional file, this attribute may also identify one or more additional characteristics associated with the file. In one example, the attribute may identify the number of duplicates of the file that are expected to be located within system 200. For example, if the user of computing device 202(1) sent the "my_doc" file as an email attachment to 10 additional computing devices within system 200, classification module 108(1) may determine that 11 duplicates of the file (i.e., the 10 emailed instances of the file and the original instance of the file) are expected to be located within system 200. Classification module 108(1) may then configure the attribute to indicate that 11 duplicates of the file are expected to be located within system 200.

In another example, the attribute may identify how frequently the file is modified. In a further example, the attribute may identify at least one storage location where an instance of the file is stored. For example, if the user of computing device 202(1) copied at least a portion of the "my_doc" file into the "duplicate_doc" file, classification module 108(1) may determine the path to the "duplicate_doc" file and then configure the attribute to identify the path to the file.

In some embodiments, the candidate-for-deduplication classification may be assigned to one or more instances of the file that derive from the file classified as a candidate for deduplication. For example, if the user of computing device 202(1) marked the "my_doc" file to indicate that the file is expected to be distributed to one or more additional computing devices within system 200, each instance of the file distributed to the additional computing devices may include the candidate-for-deduplication classification.

Similarly, a candidate-for-deduplication classification may also be assigned to one or more additional files that include at least some of the same data as the file classified as a candidate for deduplication. For example, if the user of computing device 202(1) copied at least a portion of the "my_doc" file into the "duplicate_doc" file, classification module 108(1) may classify both the "my_doc" file and the "duplicate_doc" file as candidates for deduplication.

In some embodiments, the candidate-for-deduplication classification may indicate whether the file is a favorable or unfavorable candidate for deduplication. The phrase "favorable candidate for deduplication," as used herein, generally refers to a file that is more likely than an unfavorable candidate to include redundant data. The phrase "unfavorable candidate for deduplication," as used herein, generally refers to a file that is less likely than a favorable candidate to include redundant data. Although an unfavorable candidate may be less likely than a favorable candidate to include redundant data, an unfavorable candidate may still be likely to include redundant data. For example, an unfavorable candidate for deduplication may still have at least a 75% probability of including redundant data.

In response to determining that the file's classification identifies the file as a favorable candidate for deduplication, deduplication storage system 206 may initiate one or more types of deduplication that provide one or more efficacy advantages (e.g., increased network bandwidth, one-time performance of deduplication, and/or increased ability to identify redundant data within files) over additional types of deduplication. Examples of such types of deduplication include, without limitation, source-side deduplication, in-band deduplication, variable-block deduplication, and/or various other types of deduplication. However, such efficacy advantages provided by these types of deduplication may be counterbalanced by one or more disadvantages (e.g., reduced network bandwidth, reduced availability of resources on the source computing device, increased processing delays on the source computing device) that begin to outweigh such efficacy advantages as the number of files processed for deduplication increases within system 200 (e.g., as the number of files that are somewhat less likely to include redundant data are processed for deduplication).

In response to determining that the file's classification identifies the file as an unfavorable candidate for deduplication, deduplication storage system 206 may initiate one or more additional types of deduplication that provide one or more cost-saving advantages (e.g., increased availability of resources on the source computing device and reduced processing delays on the source computing device) over the earlier-mentioned types of deduplication. Examples of such additional types of deduplication include, without limitation, target-side deduplication, out-of-band deduplication, fixed-block deduplication, and/or various other types of deduplication. Although these additional types of deduplication may be somewhat less effective than the earlier-mentioned types of deduplication, deduplication storage system 206 may be configured to initiate one or more of these additional types of deduplication on unfavorable candidates since such files may still be likely (albeit somewhat less likely than favorable candidates) to include redundant data.

In one example, the "my_doc" file may be classified, by default, as an unfavorable candidate for deduplication. In another example, classification module 108(1) may classify the "my_doc" file as a favorable candidate for deduplication in response to detection of the event that is suggestive of at least a portion of the "my_doc" file being duplicated in at least one additional file. In a further example, classification module 108(1) may classify the "my_doc" file as a favorable or unfavorable candidate for deduplication based at least in part on one or more characteristics associated with the file (e.g., how frequently the file is modified).

In some embodiments, the file may qualify for one or more specific types of deduplication based on whether the file is classified as a favorable or unfavorable candidate for deduplication. In one example, if the "my_doc" file is classified as a favorable candidate for deduplication, the "my_doc" file may qualify for source-side, in-band, and/or variable-block deduplication. In another example, if the "my_doc" file is classified as an unfavorable candidate for deduplication, the "my_doc" file may qualify for target-side, out-of-band, and/or fixed-block deduplication.

The phrase "source-side deduplication," as used herein, generally refers to any type of data deduplication performed on at least one file while the file is located on a source computing device (e.g., computing device 202(1)) prior to sending any portion of the file to a target storage device (e.g. deduplication storage system 206). Such source-side deduplication may be performed by a source-side deduplication agent installed on the source computing device. The phrase "target-side deduplication," as used herein, generally refers to any type of deduplication performed on at least one file after the file has been stored on a target storage device.

The phrase "in-band deduplication," as used herein, generally refers to any type of data deduplication performed on at least one file while the file is transitioning (during, e.g., an I/O operation) from a source computing device to a target storage device. The phrase "out-of-band deduplication," as used herein, generally refers to any type of asynchronous data deduplication performed on at least one file after the file has been stored on a target storage device.

The phrase "variable-block deduplication," as used herein, generally refers to any type of data deduplication that facilitates deduplicating variable-sized portions of one or more files. Such variable-block deduplication may also facilitate deduplicating a portion of at least one file regardless of the portion's location within the file. The phrase "fixed-block deduplication," as used herein, generally refers to any type of data deduplication that facilitates deduplicating only fixed-sized portions of one or more files.

As illustrated at step 308 in FIG. 3, the various systems described herein may maintain the file's candidate-for-deduplication classification for use in prompting a determination on whether at least a portion of the file is already stored within a particular storage device. For example, classification module 108(1) may, as part of computing device 202(1), maintain the file's candidate-for-deduplication classification for use in prompting a determination on whether at least a portion of the file is already stored in deduplication storage system 206.

The systems described herein may perform step 308 in a variety of ways. In one example, classification module 108(1) may maintain the attribute that represents the classification within the file (e.g., as metadata associated with the file). In another example, classification module 108(1) may maintain the attribute that represents the classification within file-attribute database 120(1). As will be described in greater detail below, this attribute associated with the file may enable deduplication module 110 to quickly determine whether at least a portion of the file is likely to be duplicated in at least one additional file within system 200. Upon completion of step 308, exemplary method 300 in FIG. 3 may terminate.

Although not illustrated in FIG. 3, an exemplary method for classifying files as candidates for deduplication may include one or more additional steps. In one embodiment, detection module 106(1) may detect one or more attempts (whether successful or unsuccessful) to modify the file classified as a candidate for deduplication. For example, detection module 106(1) may detect various attempts by the user of computing device 202(1) to revise the "my_doc" file after classification module 108(1) has classified the file as a candidate for deduplication. Classification module 108(1) may then determine that the number of detected attempts to revise the file is above a predetermined threshold.

In one example, classification module 108(1) may remove the file's candidate-for-deduplication classification in response to the determination that the number of detected attempts to modify the file is above a predetermined threshold. In another example, classification module 108(1) may modify the file's candidate-for-deduplication classification in response to the determination that the number of detected attempts to modify the file is above a predetermined threshold. For example, if the candidate-for-deduplication classification indicates that the "my_doc" file is a favorable candidate for deduplication, classification module 108(1) may modify the file's classification to indicate that the file is now an unfavorable candidate for deduplication.

Figure 4:
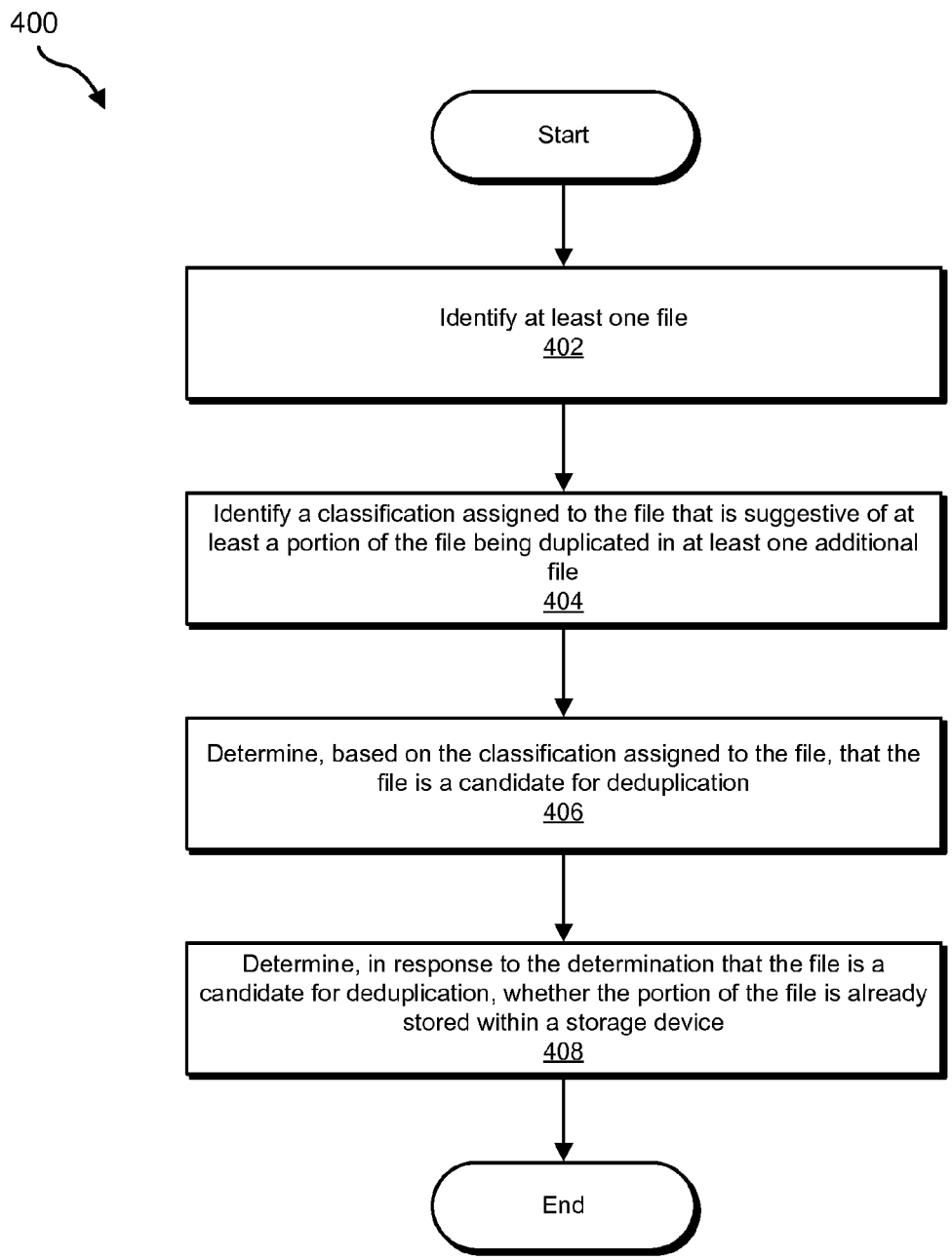
FIG. 4 is a flow diagram of another exemplary method for determining whether files are candidates for deduplication.

FIG. 4 is a flow diagram of another exemplary computer-implemented method for determining whether files are candidates for deduplication. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 510 in FIG. 5, and/or portions of exemplary network architecture 600 in FIG. 6

As illustrated at step 402 in FIG. 4, the various systems described herein may identify at least one file. For example, identification module 104(Z) may, as part of deduplication storage system 206, identify at least one file that is located in file system 112(1). This file identified by identification module 104(Z) may represent any type or form of file capable of being stored in file system 112(1) (including, e.g., a document file, a word processing file, a data file, or a program file).

The systems described herein may perform step 302 in a variety of ways. In one example, identification module 104(Z) may identify the file as part of a backup operation to back up computing device 202(1). For example, identification module 104(Z) may identify the "my_doc" file while deduplication storage system 206 (or any other suitable backup or storage-management system) is performing a backup operation, a deduplication operation, or any other storage-management operation on computing device 202(1). In another example, identification module 104(Z) may identify the "my_doc" file in response to receiving a request to copy at least a portion of the file to deduplication storage system 206.

As illustrated at step 404 in FIG. 4, the various systems described herein may identify a classification assigned to the file that is suggestive of at least a portion of the file being duplicated in at least one additional file. For example, identification module 104(Z) may, as part of deduplication storage system 206, identify a classification assigned to the file located in file system 112(1). In this example, the classification assigned to the file may be suggestive of at least a portion of the file being duplicated in at least one additional file located within system 200.

The systems described herein may perform step 404 in a variety of ways. In some examples, identification module 104(Z) may identify an attribute (e.g., metadata) associated with the "my_doc" file that indicates that at least a portion of the "my_doc" file is duplicated in at least one additional file located within system 200. In this example, the attribute may be represented by at least one binary digit of metadata that has been set to indicate that at least a portion of the "my_doc" file is duplicated in at least one additional file. In one example, identification module 104(Z) may identify the attribute associated with the "my_doc" file within the file itself. In another example, identification module 104(Z) may identify the attribute associated with the "my_doc" file within file-attribute database 120(1).

As illustrated at step 406 in FIG. 4, the various systems described herein may determine, based on the classification assigned to the file, that the file is a candidate for deduplication. The systems described herein may perform step 406 in a variety of ways. For example, deduplication module 110 may, as part of deduplication storage system 206, determine that the "my_doc" file identified in file system 112(1) is a candidate for deduplication based on the classification assigned to the "my_doc" file. In this example, deduplication module 110 may determine that the "my_doc" file is a candidate for deduplication because the classification assigned to the "my_doc" file is suggestive of at least a portion of the file being duplicated in at least one additional file located within system 200.

As illustrated at step 408 in FIG. 4, the various systems described herein may determine, in response to the determination that the file is a candidate for deduplication, whether at least a portion of the file is already stored within a particular storage device. For example, deduplication module 110 may, as part of deduplication storage system 206, determine whether at least a portion of the file identified in file system 112(1) is stored in deduplication storage system 206. Deduplication module 110 may initiate the determination on whether at least a portion of the file is stored in deduplication storage system 206 in response to the determination that the file identified in file system 112(1) is a candidate for deduplication.

The systems described herein may perform step 408 in a variety of ways. In one example, deduplication module 110 may divide the "my_doc" file into various file segments and generate a fingerprint (or hash) for each file segment of the "my_doc" file. In this example, deduplication module 110 may compare the fingerprints generated for the file segments of the "my_doc" file with a database that stores a fingerprint for each file segment backed up by deduplication storage system 206. Deduplication module 110 may then determine, based on this comparison, whether at least a portion of the "my_doc" file is stored in deduplication storage system 206.

In one example, if deduplication module 110 determines that at least a portion of the "my_doc" file is already stored in deduplication storage system 206, deduplication module 110 may refrain from copying that particular portion of the "my_doc" file to deduplication storage system 206 (e.g., deduplication module 110 or any other suitable backup system may refrain from copying or backing up a file or a portion of the file if that file is already stored in a deduplication storage system or a backup storage system). In another example, if deduplication module 110 determines that at least a portion of the "my_doc" file is already stored in deduplication storage system 206, deduplication module 110 may attempt to identify at least one redundant instance of that particular portion of the file stored in deduplication storage system 206. Upon identifying at least one redundant instance of that particular portion of the file stored in deduplication storage system 206, deduplication module 110 may remove the redundant instance of that particular portion of the file stored in deduplication storage system 206.

In a further example, if deduplication module 110 determines that at least a portion of the "my_doc" file is not already stored in deduplication storage system 206, deduplication module 110 may copy that particular portion of the "my_doc" file to deduplication storage system 206. Deduplication module 110 may also generate a fingerprint of the copied portion of the "my_doc" file and then store this fingerprint in the database that includes fingerprints of portions of files stored in deduplication storage system 206.

In one example, although not illustrated in FIG. 2, a backup system in addition to deduplication storage system 206 may encounter the "my_doc" file while performing a backup of computing device 202(1). In this example, in response to determining that the "my_doc" file is a candidate for deduplication, a deduplication module installed on the backup system may attempt to determine whether at least a portion of the "my_doc" file has already been backed up by at least one additional storage system (e.g., deduplication storage system 206 within system 200). The deduplication module installed on the backup system may then determine that the "my_doc" file has already been backed up by deduplication storage system 206. In response to the determination that the "my_doc" file has already been backed up, the deduplication module installed on the backup system may refrain from backing up or copying the "my_doc" file to the backup system.

In certain embodiments, deduplication module 110 may analyze the candidate-for-deduplication classification assigned to the "my_doc" file to determine whether the file is a favorable or unfavorable candidate for deduplication. In some examples, upon analyzing the files classification, deduplication module 110 may determine that the "my_doc" file is a favorable candidate for deduplication. In such examples, in response to the determination that the "my_doc" file is a favorable candidate for deduplication, deduplication module 110 may perform source-side, in-band, and/or variable-block deduplication on the "my_doc" file in accordance with a deduplication policy implemented by deduplication storage system 206.

In other examples, upon analyzing the files classification, deduplication module 110 may determine that the "my_doc" file is an unfavorable candidate for deduplication. In one example, in response to the determination that the "my_doc" file is an unfavorable candidate for deduplication, deduplication module 110 may perform target-side, out-of-band, and/or fixed-block deduplication on the "my_doc" file in accordance with a deduplication policy implemented by deduplication storage system 206. In another example, in response to the determination that the "my_doc" file is an unfavorable candidate for deduplication, deduplication module 110 may refrain from performing any type of deduplication on the "my_doc" file and/or refrain from copying any portion of the "my_doc" file to deduplication storage system 206. Upon completion of step 408, exemplary method 400 in FIG. 4 may terminate.

Figure 5:
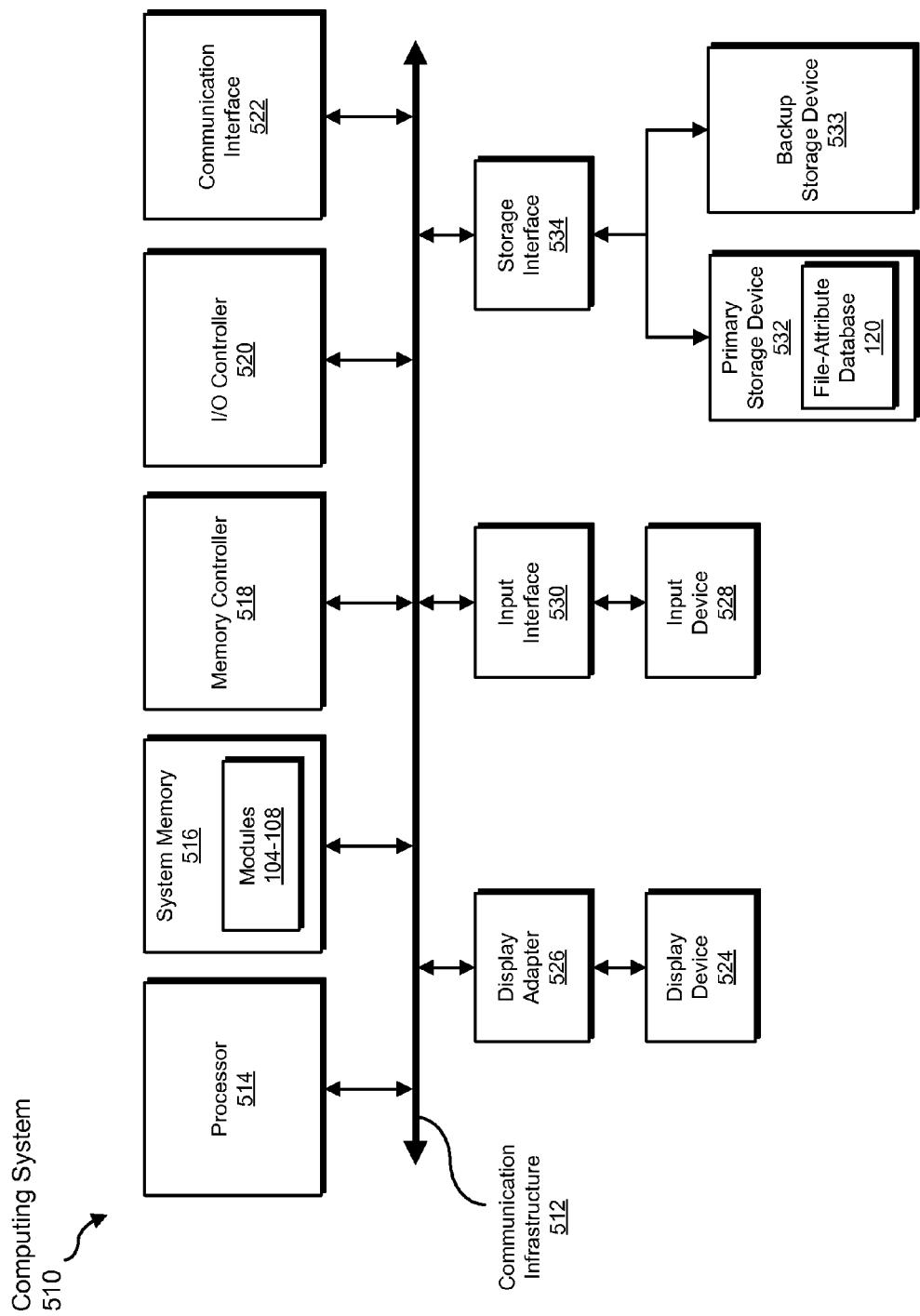
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, detecting, determining, classifying, attempting, maintaining, storing, setting, removing, refraining, and copying steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, modules 104-108 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, detecting, determining, classifying, attempting, maintaining, storing, setting, removing, refraining, and copying.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, detecting, determining, classifying, attempting, maintaining, storing, setting, removing, refraining, and copying steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, detecting, determining, classifying, attempting, maintaining, storing, setting, removing, refraining, and copying steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, detecting, determining, classifying, attempting, maintaining, storing, setting, removing, refraining, and copying steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, file-attribute database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, detecting, determining, classifying, attempting, maintaining, storing, setting, removing, refraining, and copying steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
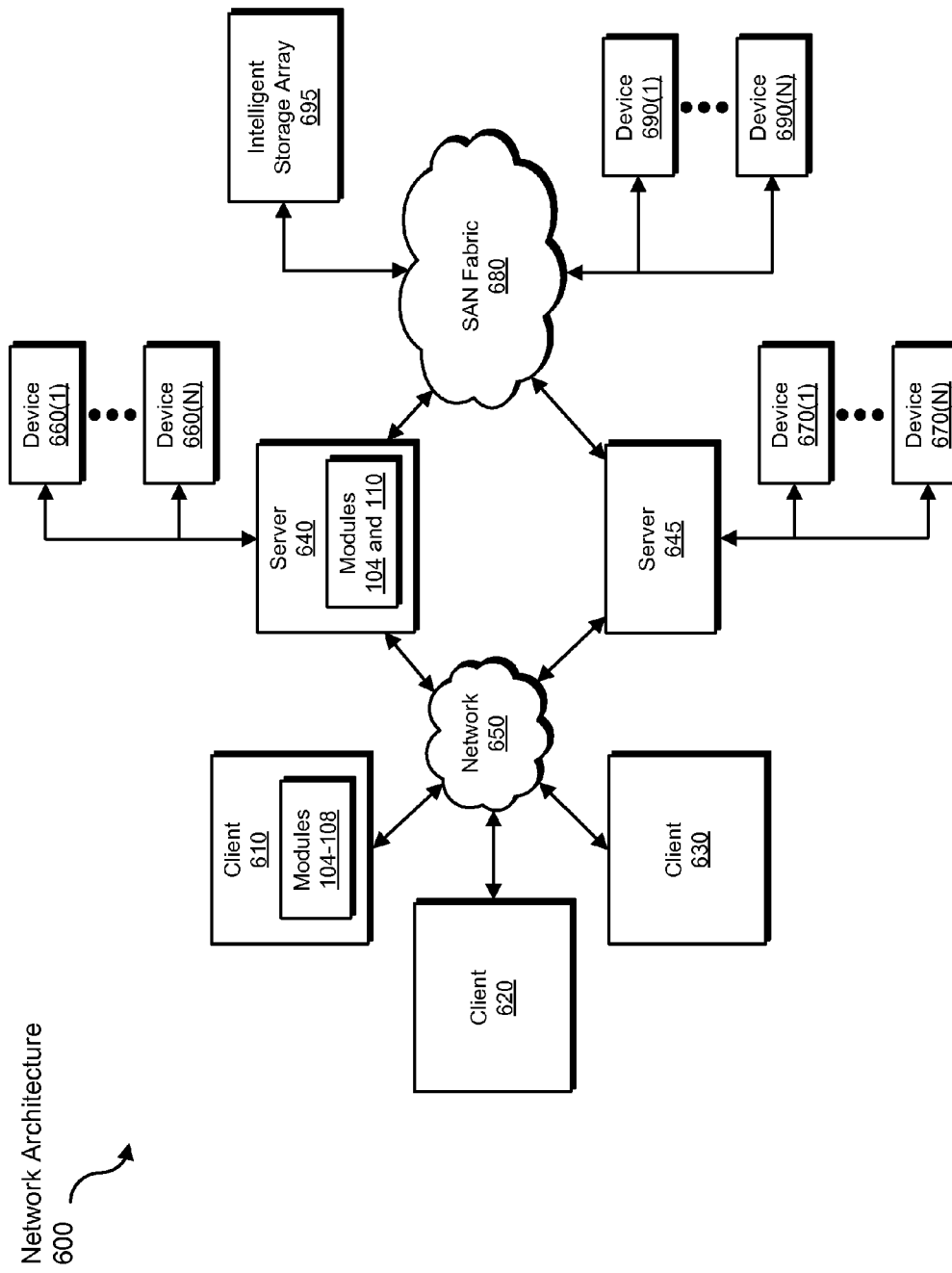
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include at least a portion of system 100 from FIG. 1. For example, client system 610 may be configured to store and/or execute modules 104-108 from FIG. 1, and server 640 may be configured to store and/or execute modules 104 and 110 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, detecting, determining, classifying, attempting, maintaining, storing, setting, removing, refraining, and copying steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for classifying files as candidates for deduplication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a characteristic or property of a physical device (such as computing device 202(1) in FIG. 2) by classifying a file as a candidate for deduplication (e.g., by setting at least one binary digit that indicates that at least a portion of the file is duplicated in the additional file).

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for classifying files as candidates for deduplication, at least a portion of the method being performed by a computing device comprising at least one processor, the method comprising:
    identifying at least a portion of a file;
    detecting an event that is suggestive of a duplicate instance of the portion of the file already being stored within a storage device prior to determining whether the duplicate instance of the portion of the file is already stored within the storage device;
    in response to detecting the event, classifying the file as a candidate for deduplication such that the file's candidate-for-deduplication classification indicates that the duplicate instance of the portion of the file is likely already stored within the storage device;
    maintaining the file's candidate-for-deduplication classification for use in prompting a determination on whether the duplicate instance of the portion of the file is already stored within the storage device by maintaining an attribute associated with the file that indicates that the file is a candidate for deduplication;
    reducing the amount of time or resources needed to determine whether a set of files that includes the file qualify for deduplication by, during deduplication or backup of data within a storage system:
        identifying the attribute associated with the file;
        determining, based on the attribute associated with the file, that the file is a candidate for deduplication;
        in response to determining that the file is a candidate for deduplication, determining whether the portion of the file is already stored within the storage device.

2. The computer-implemented method of claim 1, wherein the event that is suggestive of the duplicate instance of the portion of the file already being stored within the storage device comprises at least one of:
    an attempt by a user of a computing system to mark the file to indicate that the portion of the file is duplicated in at least one additional file;
    an attempt to copy the portion of the file into the additional file;
    an attempt by a user of a computing system to send the file as an email attachment to a plurality of additional users whose computing devices are backed up by the same backup system;
    after downloading the file to a computing system for a first time, an attempt to download the file to the computing system for a second time.

3. The computer-implemented method of claim 1, wherein the attribute associated with the file indicates that the portion of the file is duplicated in at least one additional file.

4. The computer-implemented method of claim 1, wherein maintaining the file's candidate-for-deduplication classification comprises:

maintaining, within a database, the attribute associated with the file that indicates that the duplicate instance of the portion of the file is likely already stored within the storage device.

5. The computer-implemented method of claim 1, wherein maintaining the attribute associated with the file comprises setting at least one binary digit that indicates that the duplicate instance of the portion of the file is likely already stored within the storage device.

6. The computer-implemented method of claim 1, wherein the attribute associated with the file comprises:
   metadata that identifies a number indicating how many additional files are expected to comprise a duplicate instance of the portion of the file.

7. The computer-implemented method of claim 1, further comprising:
   detecting one or more attempts to modify the file;
   determining that the number of detected attempts to modify the file is above a predetermined threshold;
   in response to determining that the number of detected attempts to modify the file is above the predetermined threshold, removing the file's candidate-for-deduplication classification.

8. The computer-implemented method of claim 1, wherein classifying the file as a candidate for deduplication comprises classifying the file as a candidate for source-side deduplication that is performed on the file prior to sending any portion of the file to the storage device.

9. The computer-implemented method of claim 1, wherein classifying the file as a candidate for deduplication comprises classifying the file as a candidate for in-band deduplication that is performed on the file while the file is transitioning to the storage device.

10. The computer-implemented method of claim 1, wherein classifying the file as a candidate for deduplication comprises classifying the file as a candidate for variable-block deduplication that facilitates deduplicating variable-sized portions of the file.

11. A computer-implemented method for determining whether files are candidates for deduplication, at least a portion of the method being performed by a computing device comprising at least one processor, the method comprising:
   identifying at least a portion of a file;
   identifying a classification assigned to the file that is suggestive of a duplicate instance of the portion of the file already being stored within a storage device by identifying, within the file, an attribute associated with the file that indicates that the file is a candidate for deduplication;
   reducing the amount of time or resources needed to determine whether a set of files that includes the file qualify for deduplication by determining, based on the classification assigned to the file, that the file is a candidate for deduplication prior to determining whether the duplicate instance of the portion of the file is already stored within the storage device;
   in response to determining that the file is a candidate for deduplication, determining whether the duplicate instance of the portion of the file is already stored within the storage device.

12. The computer-implemented method of claim 11, wherein identifying the portion of the file comprises identifying a request to copy the portion of the file to the storage device.

13. The computer-implemented method of claim 11, further comprising:
   determining that the duplicate instance of the portion of the file is already stored within the storage device;
   in response to determining that the duplicate instance of the portion of the file is already stored within the storage device, refraining from copying the portion of the file to the storage device.

14. The computer-implemented method of claim 11, further comprising:
   determining that the duplicate instance of the portion of the file is not already stored within the storage device;
   in response to determining that the duplicate instance of the portion of the file is not already stored within the storage device, copying the portion of the file to the storage device.

15. The computer-implemented method of claim 11, further comprising:
   determining that the duplicate instance of the portion of the file is already stored within the storage device;
   identifying the duplicate instance of the portion of the file stored within the storage device;
   upon identifying the duplicate instance of the portion of the file, removing the duplicate instance of the portion of the file from the storage device.

16. The computer-implemented method of claim 11, further comprising:
   detecting one or more attempts to modify the file;
   determining that the number of detected attempts to modify the file is above a predetermined threshold;
   in response to determining that the number of detected attempts to modify the file is above the predetermined threshold, removing the file's candidate-for-deduplication classification.

17. A system for classifying files as candidates for deduplication, the system comprising:
   an identification module, stored in memory, that identifies at least a portion of a file;
   a detection module, stored in memory, that detects an event that is suggestive of a duplicate instance of the portion of the file already being stored within a storage device prior to a determination of whether the duplicate instance of the portion of the file is already stored within the storage device;
   a classification module, stored in memory, that:
      classifies, in response to detecting the event, the file as a candidate for deduplication such that the file's candidate-for-deduplication classification indicates that the duplicate instance of the portion of the file is likely already stored within the storage device;
      maintains the file's candidate-for-deduplication classification for use in prompting an application to determine whether the duplicate instance of the portion of the file is already stored within the storage device by maintaining an attribute associated with the file that indicates that the file is a candidate for deduplication;
   a deduplication module, stored in memory, that reduces the amount of time or resources needed to determine whether a set of files that includes the file qualify for deduplication by, during deduplication or backup of data within a storage system:
      identifying the attribute associated with the file;
      determining, based on the attribute associated with the file, that the file is a candidate for deduplication;
      determining, in response to determining that the file is a candidate for deduplication, whether the portion of the file is already stored within the storage device;

at least one processor that executes the identification module, the detection module, the classification module, and the deduplication module.

18. The system of claim 17, wherein the detection module detects the event that is suggestive of the duplicate instance of the portion of the file already being stored within the storage device by performing at least one of:
- detecting an attempt to copy the portion of the file into at least one additional file;
- detecting, after downloading the file to a computing device for a first time, an attempt to download the file to the computing device for a second time.

19. The system of claim 17, wherein the detection module detects the event that is suggestive of the duplicate instance of the portion of the file already being stored within the storage device by detecting an attempt by a user of a computing device to send the file as an email attachment to a plurality of additional users whose computing devices are backed up by the same backup system.

20. The system of claim 17, wherein the classification module maintains the file's candidate-for-deduplication classification by:
- maintaining, within a database, the attribute associated with the file that indicates that the duplicate instance of the portion of the file is likely already stored within the storage device.

\* \* \* \* \*